United States Patent [19]

Woods

[11] 4,384,824
[45] May 24, 1983

[54] UNIVERSAL FAN FOR FAN CLUTCH

[75] Inventor: Robert L. Woods, Haslet, Tex.

[73] Assignee: Eagle-Motive Industries, Inc., Fort Worth, Tex.

[21] Appl. No.: 261,363

[22] Filed: May 7, 1981

[51] Int. Cl.³ .............................................. F01D 7/08
[52] U.S. Cl. .............................. 416/169 A; 123/41.11
[58] Field of Search ........... 416/169 A, 244 R, 214 R; 123/41.11

[56] References Cited

U.S. PATENT DOCUMENTS

| | | | |
|---|---|---|---|
| 1,999,326 | 4/1935 | Forsyth | 416/214 R |
| 3,407,882 | 10/1968 | Wooden et al. | 416/244 |
| 3,485,444 | 12/1969 | Linzenkirchner | 416/169 A |
| 3,749,519 | 7/1973 | Ryba | 416/244 X |
| 4,150,919 | 4/1979 | Matucheski | 416/169 A X |
| 4,245,960 | 1/1981 | Matthews | 416/244 R |
| 4,325,650 | 4/1982 | Masai | 416/244 R X |

FOREIGN PATENT DOCUMENTS

| | | | |
|---|---|---|---|
| 125419 | 4/1919 | United Kingdom | 416/244 |
| 203814 | 9/1923 | United Kingdom | 416/244 |

Primary Examiner—Philip R. Coe
Assistant Examiner—Frankie L. Stinson
Attorney, Agent, or Firm—Wm. T. Wofford; James C. Fails; Arthur F. Zobal

[57] ABSTRACT

A fan for attachment to fan clutch housing members having supporting shoulders at two different radial distances from their axis, respectively. The fan comprises a plurality of fan blade supporting arms extending radially outward from a hub and a central opening formed through the hub. The central opening is defined by a plurality of angularly spaced apart inner arcuate edges located at a first radial distance from the axis of the hub and a plurality of angularly spaced apart outer arcuate edges located at a second radial distance from the axis of the hub, wherein the second radial distance is greater than the first radial distance.

1 Claim, 3 Drawing Figures

UNIVERSAL FAN FOR FAN CLUTCH

BACKGROUND OF THE INVENTION

1. Field of the Invention

The present invention relates to a universal fan for attachment to motor vehicle fan clutch housings.

2. Description of the Prior Art

Fluid coupling fan clutches for internal combustion engines of motor vehicles such as automobiles are manufactured by a number of different companies. One type of fluid coupling fan clutch is disclosed in U.S. Pat. No. 3,575,269 which is incorporated into this application by reference. Fan clutches of this type generally have the fan attached to the side of the housing which faces the motor. The fan comprises a fan spider having a plurality of fan blade supporting arms extending radially outward from a central hub. A central opening is formed through the hub. The fan is attached to the housing with bolts with the inner edge of the central opening of the fan engaging supporting shoulders of the housing. Fan clutches of this type manufactured by different companies have supporting shoulders and bolt holes at different radial distances from their axes. Thus, heretofore, a separate fan has been required for the different fan clutches manufactured by the different companies. This increases the cost and inventory a supplier must maintain.

SUMMARY OF THE INVENTION

It is an object of the present invention to provide a fan for attachment to fan clutch housing members having supporting shoulders at different radial distances from their axes.

The fan comprises a plurality of fan blade supporting arms extending radially outward from a hub having a central opening formed therethrough. The central opening is defined by a plurality of angularly spaced apart inner edges located at a first radial distance from the axis of the hub and a plurality of angularly spaced apart outer edges located at a second radial distance from the axis of the hub, wherein said second radial distance is greater than said first radius. The two sets of edges at the two different radial distances from the axis of the hub allows the fan to fit fan clutch housing members having supporting shoulders at two different radial distances from their axes.

BRIEF DESCRIPTION OF THE DRAWINGS

In FIG. 2, the fins of the housing member are not shown for purposes of clarity.

In FIG. 3, the fins of the housing member are not shown for purposes of clarity.

DESCRIPTION OF THE PREFERRED EMBODIMENT

Figure 1:
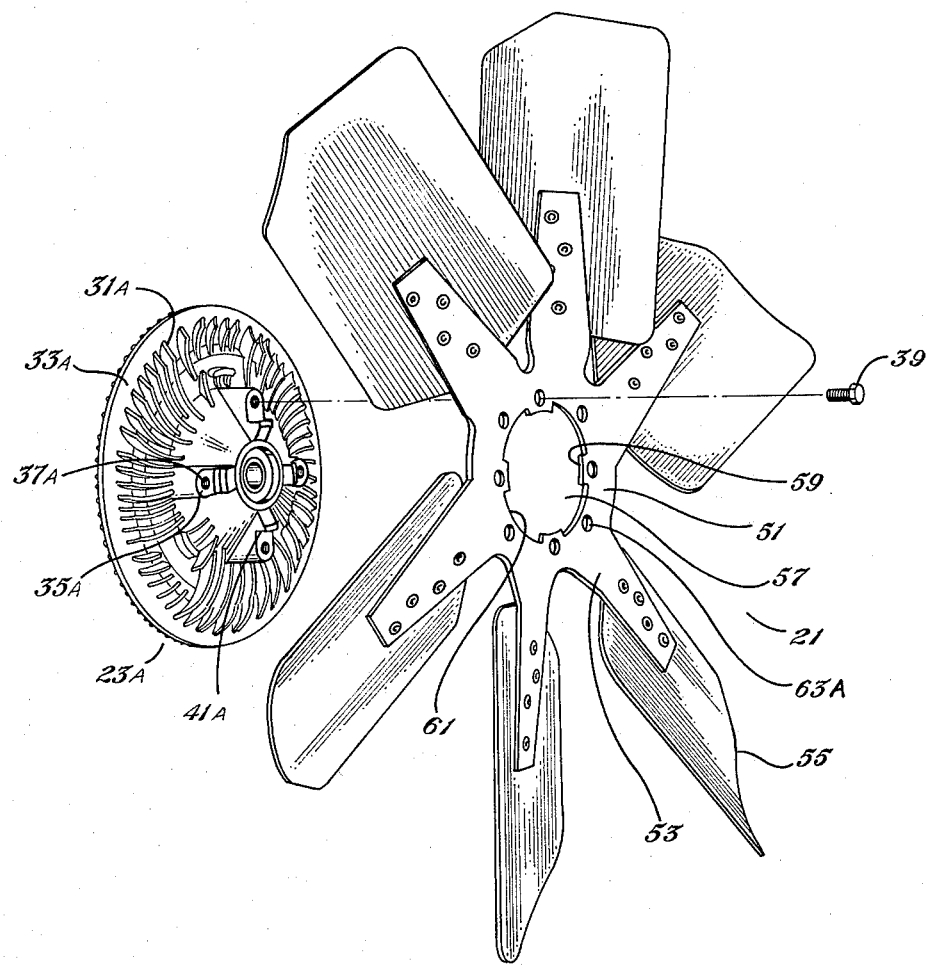
FIG. 1 is an perspective view of the fan of the present invention and a perspective view of a housing member of a fan clutch.
Figure 2:
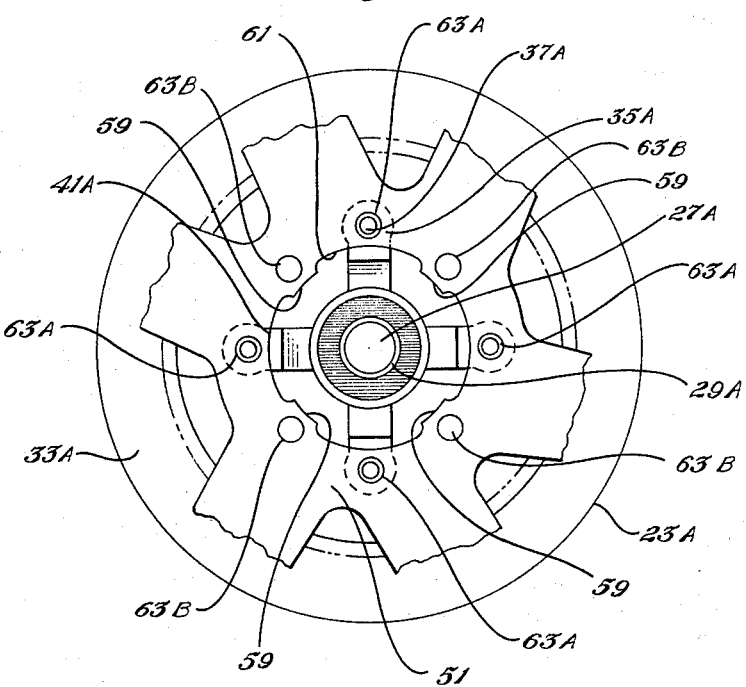
FIG. 2 is a partial plan view of the fan spider of the fan of FIG. 1 attached to a fan clutch housing member having supporting shoulders at one radial distance from its axis.
Figure 3:
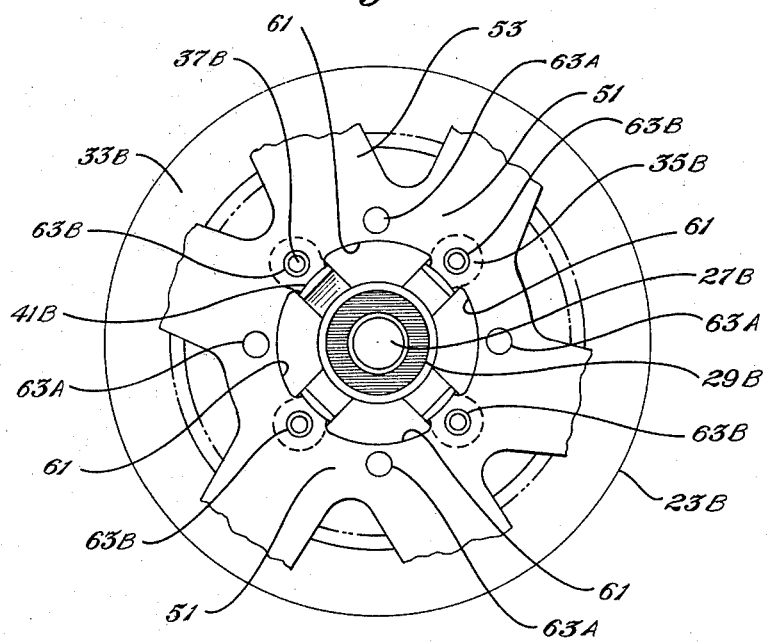
FIG. 3 is a partial plan view of the fan spider of the fan of FIG. 1 attached to a fan clutch housing member having supporting shoulders at a smaller radial distance from its axis.

Referring now to the drawings, reference numeral 21 identifies a fan adapted to be attached to housing member 23A of a fluid coupling fan clutch or to housing member 23B of a fluid coupling fan clutch. The complete fan clutches are not illustrated, however, members 23A and 23B form one side of their fan clutches. Members 23A and 23B correspond with member 10 of the fan clutch of U.S. Pat. No. 3,575,269. Referring to member 23A, it comprises a central opening 27A having an angular bearing member 29A for receiving a shaft. Cooling fins 31A are provided on the exterior side 33A which faces the engine when the fan clutch is mounted in place. Four bosses 35A surround the central opening 27A and have threaded apertures 37A formed therein for receiving bolts for attaching a fan to the side of the housing membr 23A. Supporting shoulders 41A extend outward from the bosses parallel with the axis of the housing member 23A. The centers of each of the apertures 37A are located at the same radial distance from the axis of the housing member 23A. Each of the shoulders 41A are arcuate in shape and are located at the same radial distance from the axis of the housing member 23A. The angle between radial lines extending through the center portions of adjacent bosses 35A, adjacent shoulders 41A and through the diameters of adjacent apertures 35A is 90°. A fan with a central opening formed therethrough is attached to the member 23A by seating the hub of the fan on the bosses 35A with the inner edge engaging the shoulders 41A and securing the fan to bosses 35A and to shoulders 41A with bolts. Housing member 23B is the same as member 23A except that bosses 35B, apertures 37B, and shoulders 41B are at radial distances from the axis of the housing member 23B which are less than the radial distances that bosses 35A, apertures 37A, and shoulders 41A, respectively are from the axis of the housing member 23A. Thus in the past, two different fans were required for housing members 23A and 23B.

In accordance with the present invention, there is provided a fan 21 which can be attached to either of housing members 23A or 23B. The fan 21 comprises a fan spider defined by a hub 51 with a plurality of arms 53 extending radially outward therefrom. A fan blade 55 is attached to each arm. The hub has a central opening 47 formed therethrough. The central opening 57 is defined by four angularly spaced apart inner edges 59 located at a first radial distance from the axis of the hub and four angularly spaced apart outer edges 61 located at a second radial distance from the axis of the hub. The second radial distance is greater than the first radial distance. The angle between radial lines extending through the central portions of adjacent edges 59 is 90°. Similarly, the angle between radial lines extending through the central portions of adjacent edges 61 is 90°. The edges 61 are arcuate in shape and are located at a radial distance from the axis of the hub which corresponds with radial distance of the shoulders 41A from the axis of the housing member 23A. The edges 59 are arcuate in shape and are located at a radial distance from the axis of the hub which correspond with the radial distance of the shoulders 41B from the axis of the housing member 23B. Apertures 63A are formed through hub 51 radially outward from the edges 61 and apertures 63B are formed through hub 51 radially outward from edges 59. The centers of each aperture 63A are at the same radial distance from the axis of the hub 51. The centers of each aperture 63B are at the same radial distance from the axis of the hub 51. Each aperture 63A and 63B is on a radial line extending through the central portion of an edge 61 or 59. The center of each aperture 63A is at a radial distance from the axis of the hub 51 which equals the radial distance of the center of each aperture 37A from the axis of the housing member 23A. The center of each aperture 63B is at a radial distance from the axis of the hub 51 which equals the radial distance of the center of each aperture 37B from the axis of the housing member 23B. In order to attach the fan 21 to the housing member 23A, the fan is located such that edges 61 surround and engage shoulders 41A and the apertures 63A are in alignment with apertures 37A. Bolts 39 then are inserted through apertures 63A and screwed into threaded apertures 37A. In order to attach the fan to housing member 23B, the fan is located such that edges 59 surround and engage shoulders 41B and the apertures 63B are in alignment with apertures 37B. Bolts 39 then are inserted through aligned apertures 63B and screwed into threaded apertures 37B.

In one embodiment the radial distance of each of the edges 59 from the axis of the hub is 1 3/16 inches and the radial distance of each of the edges 61 from the axis of the hub is 1 5/16 inches. Edges 59 will fit a housing member 23B having shoulders 41B at a radial distance from its axis slightly less than 1 3/16 inches. Edges 61 will fit a housing member 23A having shoulders 41A at a radial distance from its axis slightly less than 1 5/16 inches. The radial distance of the centers of each of the apertures 63A from the axis of the hub 51 is 1 ⅜ inches. The radial distance of the centers of each of the apertures 63B from the axis of the hub 51 is 1 ¼ inches.

It is to be understood that fans incorporating the present invention may be made to fit housing members having supporting shoulders and bolt holes at different radial distances from their axes than that described above.

Although the fan of the present invention has been described as being used with fluid coupling fan clutches, it is to be understood that it could be used with other type of fan clutches.

I claim:

1. A fan for attachment to the driven housing of a fluid coupling type fan clutch for an automotive internal combustion engine, wherein said driven housing has an axis of rotation and is provided fan mounting means comprising a plurality of bosses each of which has a planar fan mounting surface, with said planar fan mounting surfaces lying in a common plane which is normal to said axis of rotation, with each said boss having a threaded aperture opening to a respective said fan mounting surface with said threaded apertures being equidistant from said axis of rotation, and a supporting shoulder having an arcuate surface extending axially outwardly from each said boss and with all points on the arcuate surfaces of said shoulders being equidistant from said axis of rotation, and with said fan comprising:

a. a hub portion having a central opening which has a central axis and the periphery of which is defined by a first set of angularly spaced apart arcuate inner edges located at a first radial distance from said central axis and a second set of angularly spaced apart arcuate outer edges located at a second radial distance from said central axis, with said second radial distance being greater than said first radial distance, with each respective said arcuate outer edge of said first set being disposed between respective adjacent arcuate inner edges of said second set;

b. said hub portion further having a first set of bolt receiving apertures that are located equidistant from said central axis and a respective one of which is centered on the radial bisector of a respective arcuate outer edge, with the radial distance to said second set of apertures being greater than the radial distance to said first set of apertures;

c. said first set of arcuate inner edges and said first set of bolt receiving apertures being sized for mating with the respective bosses, threaded apertures and supporting shoulders of a said driven housing of a first size;

d. said second set of arcuate outer edges and said second set of bolt receiving apertures being sized for mating with the respective bosses, threaded apertures and supporting shoulders of a said driven housing of a second size.

* * * * *